(12) United States Patent
Hotta et al.

(10) Patent No.: US 12,366,646 B2
(45) Date of Patent: Jul. 22, 2025

(54) AXIAL DISPLACEMENT ESTIMATION DEVICE

(71) Applicant: DENSO CORPORATION, Kariya (JP)

(72) Inventors: Hiroyuki Hotta, Kariya (JP); Koichi Sato, Kariya (JP); Hiroto Nakatani, Kariya (JP); Yuuji Katou, Kariya (JP)

(73) Assignee: DENSO CORPORATION, Kariya (JP)

( * ) Notice: Subject to any disclaimer, the term of this patent is extended or adjusted under 35 U.S.C. 154(b) by 446 days.

(21) Appl. No.: 18/054,454

(22) Filed: Nov. 10, 2022

(65) Prior Publication Data

US 2023/0061836 A1   Mar. 2, 2023

Related U.S. Application Data

(63) Continuation of application No. PCT/JP2021/018479, filed on May 14, 2021.

(30) Foreign Application Priority Data

May 15, 2020   (JP) ................................. 2020-085975

(51) Int. Cl.
*G01S 13/68* (2006.01)
*G01S 13/931* (2020.01)

(52) U.S. Cl.
CPC ............ *G01S 13/68* (2013.01); *G01S 13/931* (2013.01)

(58) Field of Classification Search
CPC ............. G01S 13/931; G01S 2013/932; G01S 7/4091; G01S 17/931; G01S 7/40; G01S 7/4972; G01S 2013/93275; G01S 15/931; G01S 7/52004; G01S 7/521; G01S 2013/93272; G01S 15/04; G01S 13/68; B60R 21/00; B60R 21/0134; G01B 21/24; G01B 7/31; G01B 11/0608; B62D 6/002; B60Q 1/143
See application file for complete search history.

(56) References Cited

U.S. PATENT DOCUMENTS

| 2016/0011299 A1 | 1/2016 | Satou et al. |
| 2016/0291132 A1* | 10/2016 | Goto ..................... G01S 13/931 |
| 2017/0262716 A1 | 9/2017 | Matsumoto |
| 2023/0074625 A1* | 3/2023 | Hotta ..................... G01S 13/58 |

* cited by examiner

*Primary Examiner* — Vladimir Magloire
*Assistant Examiner* — Peter Davon Doze
(74) *Attorney, Agent, or Firm* — Maschoff Brennan (57) ABSTRACT

An axial displacement angle estimation device repeatedly calculates an axial displacement angle based on the detection result of the radar apparatus. The axial displacement angle estimation device extracts the axial displacement angle included in a predetermined extraction angle range among a plurality of axial displacement angles, and calculate an average value and a median value of the extracted plurality of axial displacement angles to be an axial displacement angle average value and an axial displacement median value. The axial displacement angle estimation device determines, based on the axial displacement angle average value and the axial displacement angle median value, whether a predetermined allowable condition is met. The axial displacement angle estimation device utilizes, when determined that the predetermined allowable condition is met, the axial displacement angle average value as an estimation result of the axial displacement angle.

3 Claims, 9 Drawing Sheets

AXIAL DISPLACEMENT ESTIMATION DEVICE

CROSS-REFERENCE TO RELATED APPLICATIONS

This application is the U.S. bypass application of International Application No. PCT/JP2021/18479 filed on May 14, 2021, which designated the U.S. and claims priority to Japanese Patent Application No. 2020-85975 filed on May 15, 2020, the contents of both of these are incorporated herein by reference.

BACKGROUND

Technical Field

The present disclosure relates to an axial displacement estimation device that estimates an angle of an axial displacement of a radar apparatus.

Description of the Related Art

As an example of the related art, an on-vehicle radar apparatus is disclosed in which an axial displacement that satisfies a predetermined exclusion condition is excluded among a plurality of detected axial displacement angles, and an average value of the plurality of axial displacement angles which were not excluded is determined as the conclusive axial displacement angle.

SUMMARY

The present disclosure improves an estimation accuracy of the axial displacement angle. One aspect of the present disclosure provides an axial displacement estimation device that estimates an axial displacement angle of a radar apparatus mounted on a mobile body. The axial displacement estimation device includes an angle calculation unit, an average value calculation unit, a median value calculation unit, a utilization determination unit and a utilization unit.

DETAILED DESCRIPTION OF THE PREFERRED EMBODIMENTS

As related art, patent literature JP-A-2014-153256 discloses an on-vehicle radar apparatus in which an axial displacement that satisfies a predetermined exclusion condition is excluded among a plurality of detected axial displacement angle, and an average value of the plurality of axial displacement angles which are not excluded is determined as the conclusive axial displacement angle. As a result of inventors detailed research, a problem has been found that an estimation accuracy of the axial displacement angle may be deteriorated.

Hereinafter, with reference to the drawings, embodiments of the present disclosure will be described.

A radar apparatus 1 according to the present embodiment is mounted to a vehicle such as four-wheel vehicles and detects various objects existing around the vehicle. In the following, a vehicle provided with the radar apparatus mounted thereof is referred to as an own vehicle.

Figure 1:
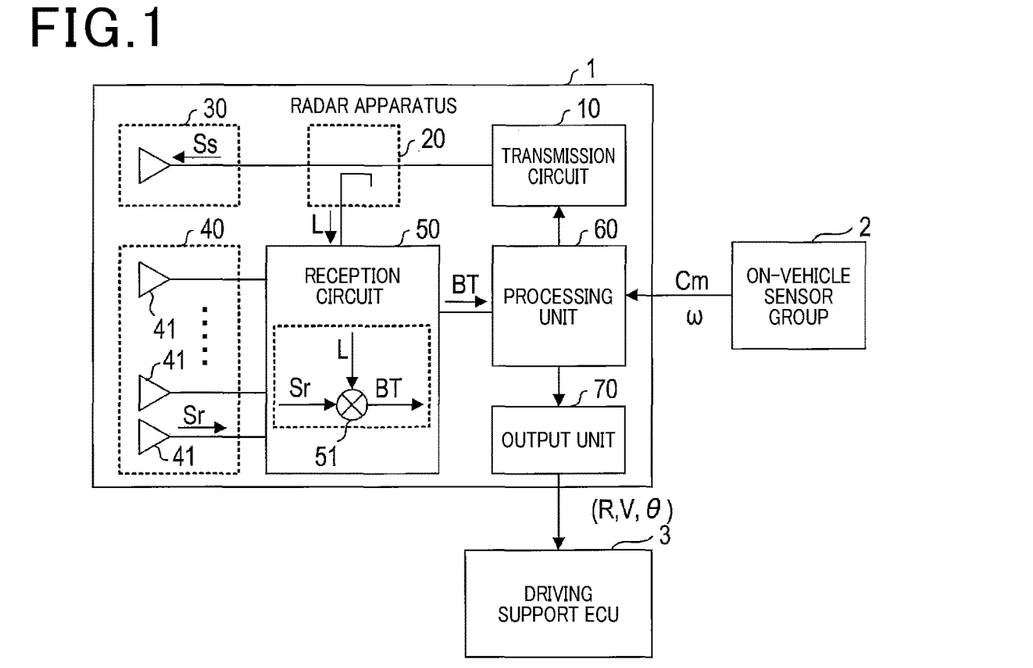
FIG. 1 is a block diagram showing a configuration of a radar apparatus.

The radar apparatus 1 transmits radar waves ahead of the own vehicle and receives reflected radar waves, thereby detecting a distance R to the object which reflected the radar waves, a relative speed V between the own vehicle and the object, and an azimuth θ with which the object is present. As shown in FIG. 1, the radar apparatus 1 outputs the detection values (R, V, θ) to a driving support ECU 3.

The driving support ECU 3 executes, based on the detection values (R, V, θ) of respective objects transmitted from the radar apparatus 1, processes for supporting driving of the vehicle by the driver.

The radar apparatus 1 is provided with a transmission circuit 10, a distributor 20, a transmission antenna 30, a reception antenna 40, a reception circuit 50, a processing unit 60 and an output unit 70.

The transmission circuit 10 supplies a transmission signal Ss to the transmission antenna 30. The transmission circuit 10 outputs a millimeter-wave band high frequency signal to the distributor 20 positioned in the upper stream side of the transmission antenna 20. Specifically, the transmission circuit 10 repeats a modulation period at a measurement period Tm. In the modulation period, a high frequency signal (hereinafter referred to as up-down chirp) is generated with a frequency-modulation such that the frequency increases in an up-chirp and decreases in a down-chirp. The transmission circuit 10 outputs the generated high frequency signals to the distributor 20.

The distributor 20 power-distributes the high frequency signal transmitted from the transmission circuit 1 into the transmission signal Ss and the local signal L.

The transmission antenna 30 radiates, based on the transmission signal Ss supplied from the distributor 20, radar waves having a frequency corresponding to the transmission signal Ss, ahead of the own vehicle. The transmission antenna 30 may be configured of a plurality of antennas.

The reception antenna 40 is for receiving the radar waves reflected at an object (hereinafter referred to as reflected waves). The reception antenna 40 is provided with a plurality of antenna elements 41. The reception antenna 40 is installed such that the center axis of the detection range of the reception antenna 40 corresponds to the travelling direction of the own vehicle. The reception signal Sr of the reflected waves received by the respective antenna elements 41 is transmitted to the reception circuit 50.

The reception circuit 50 processes the reception signal Sr transmitted from the respective antennal elements 41 that constitute the reception antenna 40 and outputs the beat signal BT for each antenna element 41. Specifically, the reception circuit 50 mixes the reception signals Sr transmitted from respective antenna elements 40 and the local signal L transmitted from the distributor 20 by using the mixer 51, thereby generating the beat signal BT for each antenna element 41. and outputs them.

However, processes for outputting the beat signal BT includes a process for amplifying the reception signal Sr, a process for eliminating unnecessary signal component from the beat signal BT, and a process for converting the beat signal BT to the digital data. Thus, the reception circuit 50 converts the beat signal BT for each antenna element 41 to the digital data and outputs them. The outputted beat signal BT for each antenna element 41 is transmitted to the processing unit 60. Hereinafter, A/D conversion data of the beat signal BT is referred to as modulation data.

The processing unit 60 is an electronic control unit 60 configured mainly of a microprocessor provided with a coprocessor that executes fast Fourier transformation in addition to CPU, ROM and RAM. Various functions of the microprocessor are accomplished when the CPU executes programs stored in a non-transitory tangible recording media. In this example, the ROM corresponds to the non-transitory tangible recording media. Further, when executing the program, methods corresponding to the program is executed. Note that, a part of or all of functions executed by the CPU may be configured as hardware circuitry such as a single IC or a plurality of ICs. The number of microprocessors that constitute the processing unit 60 may be one or more.

The processing unit 60 analyzes the beat signal BT for each antenna element 41, thereby executing an object detecting process that calculates detection values (R, V, θ) for each object that reflected radar waves.

For the processing unit 60, various detection signals are inputted from the on-vehicle sensor group 2. The on-vehicle sensor group 2 is composed of various sensors mounted on the vehicle to detect state of the vehicle. The on-vehicle sensor group 2 includes a vehicle speed sensor that detects a vehicle speed and a yaw rate sensor that detects a yaw rate. The vehicle speed sensor outputs vehicle speed information indicating the detected vehicle speed Cm. The yaw rate sensor outputs yaw rate information indicating detected yaw rate ω. Hereinafter, the vehicle speed information and the yaw rate information are referred to as odometry information.

The output unit 70 outputs the detection values (R, V, θ) calculated by the processing unit 60 to the driving support ECU 3.

Next, procedure of an object detecting process executed by the processing unit 60 will be described. The object detecting process is repeatedly executed when the processing unit 60 is in operation.

Figure 2:
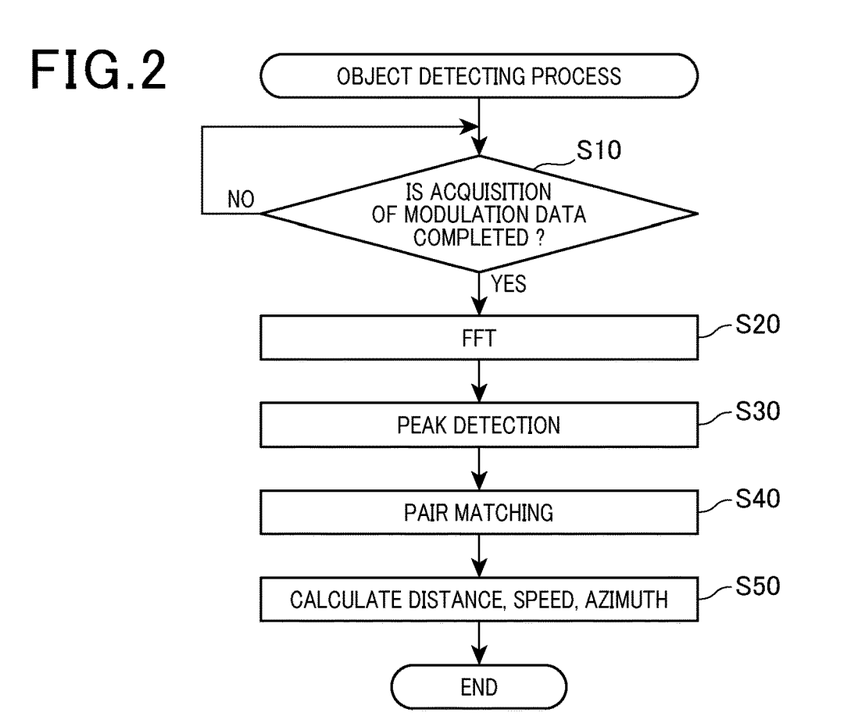
FIG. 2 is a flowchart showing an object detecting process.

When executing the object detecting process, as shown in FIG. 2, the processing unit 60 determines, at step S10, whether the modulation data (i.e. beat signal of up-down chirp) has acquired. Here, when the modulation data has not been acquired, the processing unit 60 repeats executing the process of S10 to wait the completion of acquisition of the modulation data.

Then, when acquisition of the modulation data has been completed, the processing unit 60 executes, at step S20, the FFT process (i.e. frequency analyzing process) to the modulation data for each antenna element 41 and at an up chirp period and a down chirp period, thereby generating a power spectrum. The power spectrum indicates the power of reflected waves for each frequency component.

Further, the processing unit 60 calculates, at step S30, an average power spectrum in which the power spectrum is averaged at each up-chirp period and each down-chirp period, and extracts a peak which exceeds a peak detection threshold of which the power is set in advance.

Then, the processing unit 60 executes a pair matching process that pairs peaks in the up-chirp period and the down-chirp period which are produced in accordance with reflected waves from the same object. Since the pair matching process is a well-known technique and various specific methods are possible, the explanation thereof is omitted here.

The processing unit 60 calculates, at S50, a distance, a relative speed and an azimuth for each object, thereby generating the detection values (R, V, θ) and terminates the object detecting process.

Specifically, the processing unit 60 firstly calculates, based on the frequencies of peaks combined through the pair matching process, the distance and the relative speed for each object by using the known method of up-down chirp radar. Further, the processing unit 60 calculates, for each object, an azimuth identified by the peak frequencies, in accordance with a phase difference between signal components having the same peak frequency acquired from the plurality of antenna elements 41 in the reception antenna 40 for two peaks combined through the pair matching process.

Subsequently, a procedure of the axial displacement correction process executed by the processing unit 60 will be described. The axial displacement correction process is repeatedly executed at every measurement period Tm while the processing unit 60 is in operation.

Figure 3:
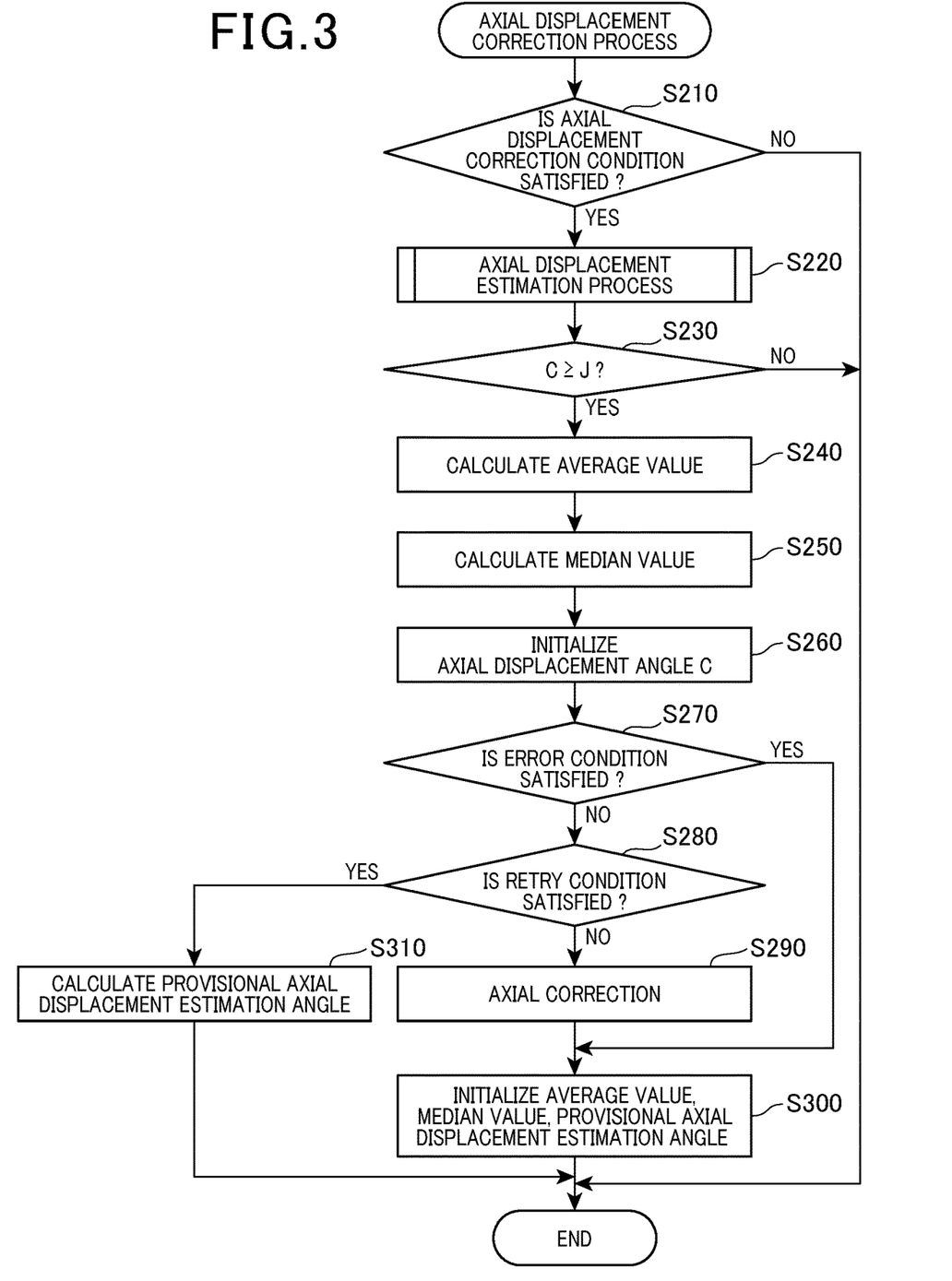
FIG. 3 is a flowchart showing an axial displacement correction process.

When the axial displacement correction process is executed, as shown in FIG. 3, the processing unit 60 determines whether a predetermined axial displacement correction condition is satisfied at S210. According to the present embodiment, the predetermined axial displacement correction condition refers to a condition where a vehicle speed or a yaw rate detected by the on-vehicle sensor group 2 satisfies a predetermined condition. Here, when the predetermined axial displacement correction condition is not satisfied, the processing unit 60 does not execute the axial displacement correction process in the current cycle.

On the other hand, when the predetermined axial displacement correction condition is satisfied, the processing unit 60 executes the axial displacement estimation process.

Figure 4:
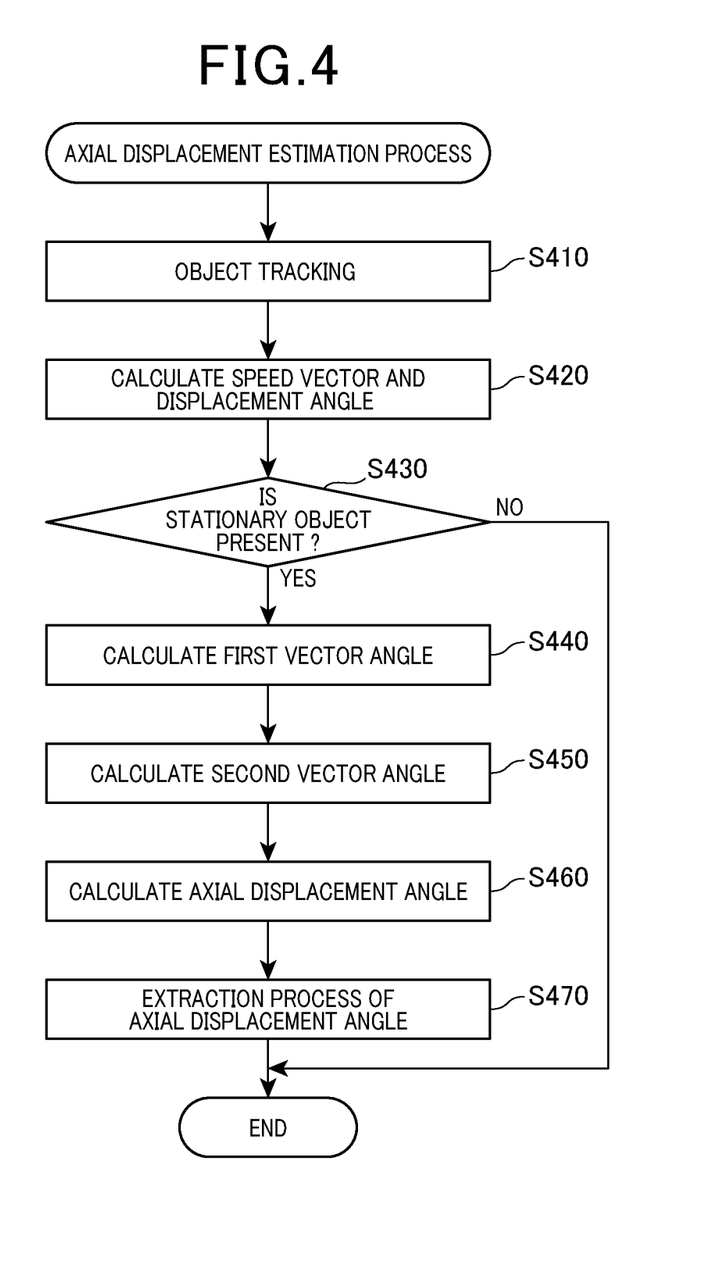
FIG. 4 is a flowchart showing an axial displacement estimation process.

Here, a procedure of the axial displacement estimation process will be described. Once the axial displacement estimation process is executed, as shown in FIG. 4, the process performs, at S410, an object tracking based on the detection value generated at S50. Thus, a first measurement data is generated indicating a position (Sx, Sy) on an xy coordinate plane in front of the own vehicle and the relative speed vector Vz relative to the own vehicle for at least one stationary object in front of the own vehicle (See FIG. 5). Note that y axis on the xy coordinate plane is the center axis of the reception antenna 40. The x axis on the xy coordinate plane is an axis orthogonal to the center axis of the reception antenna 40.

Figure 5:
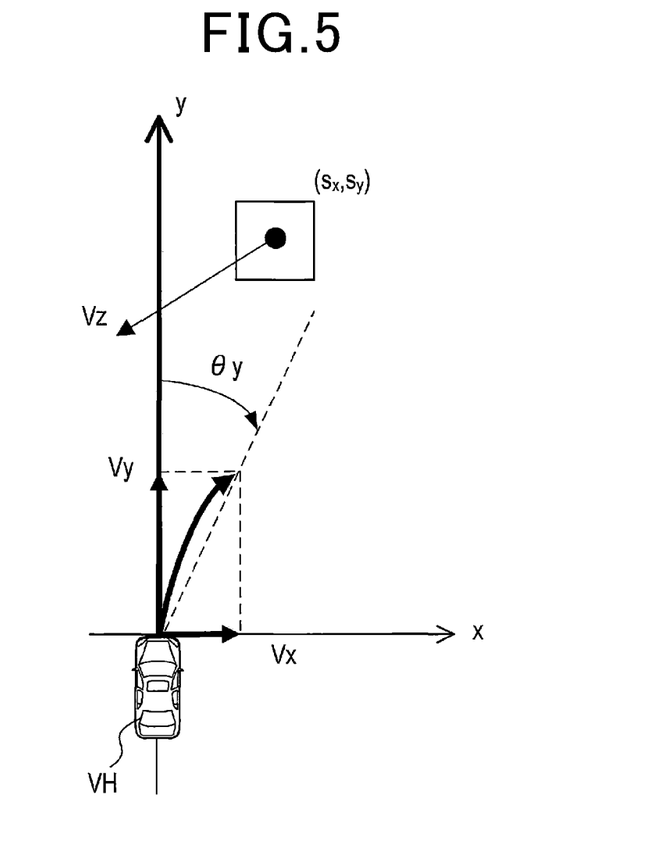
FIG. 5 is a diagram showing a speed vector of an own vehicle and a stationary object.

Next, at S420, the processing unit 60 calculates a speed vector (Vx, Vy) and a displacement angle $\theta_y$ based on odometry information acquired from the on-vehicle sensor group 2 (See FIG. 5).

Then, at S430, the processing unit 60 determines whether a stationary object is present among objects with which the object tracking is performed at S410. Specifically, the processing unit 60 compares the relative speed vector Vz of respective objects measured at S419 relative to the own vehicle with the speed vector (Vx, Vy) of the own vehicle calculated from the odometry information, thereby determining whether the respective objects are stationary objects.

Here, when no stationary object is present, the processing unit 60 terminates the axis displacement estimation process. On other hand, when a stationary object is present, the processing unit 60 calculates a first vector angle θb at S440.

Figure 6:
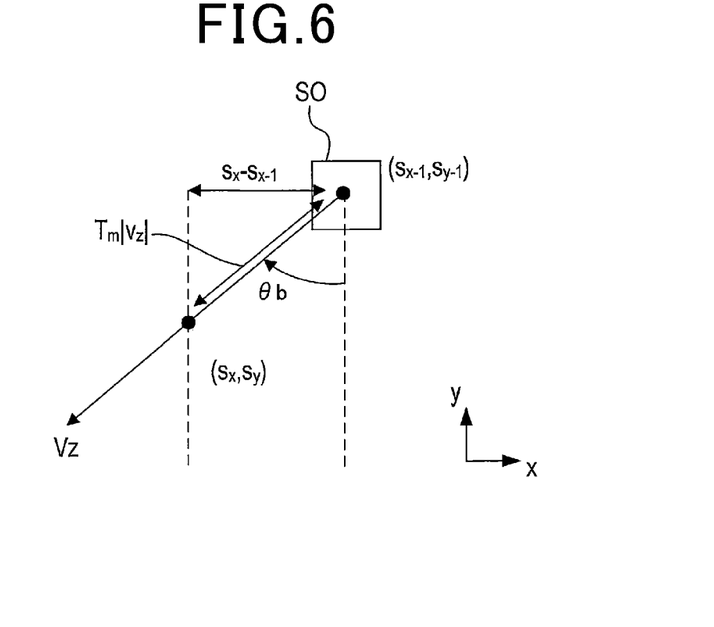
FIG. 6 is a diagram showing a first vector angle.

As shown in FIG. 6, the first vector angle θb is a vector angle calculated from the position (Sx, Sy) of the stationary object on the XY coordinate plane in front of the own vehicle and the position (Sx-1, Sy-1) detected at a time which is a measurement period Tm prior to the current period and the relative speed vector Vz. The processing unit 60 calculates the first vector angle θb in accordance with the equation (1) below.

[Math 1]

$$\theta b = \sin^{-1}\left(\frac{S_x - S_{x-1}}{T_m |v_z|}\right) \quad (1)$$

Further, as shown in FIG. 4, the processing unit 60 performs an Ego-motion that predicts the behavior of the own vehicle based on the odometry information at S450, thereby calculating the second vector angle θe. That is, the processing unit 60 utilizes the displacement angle $\theta_y$, the speed vector (Vx, Vy) and the position (Sx-1, Sy-1) of the stationary object detected at a time a measurement period Tm prior to the current period to calculate the estimation position (S'x, S'y) in accordance with the equation (2) below. Then, the processing unit 60 utilizes the positions (Sx-1, Sy-1) and (S'x, S'y) to calculate the second vector angle θe.

Figure 7:
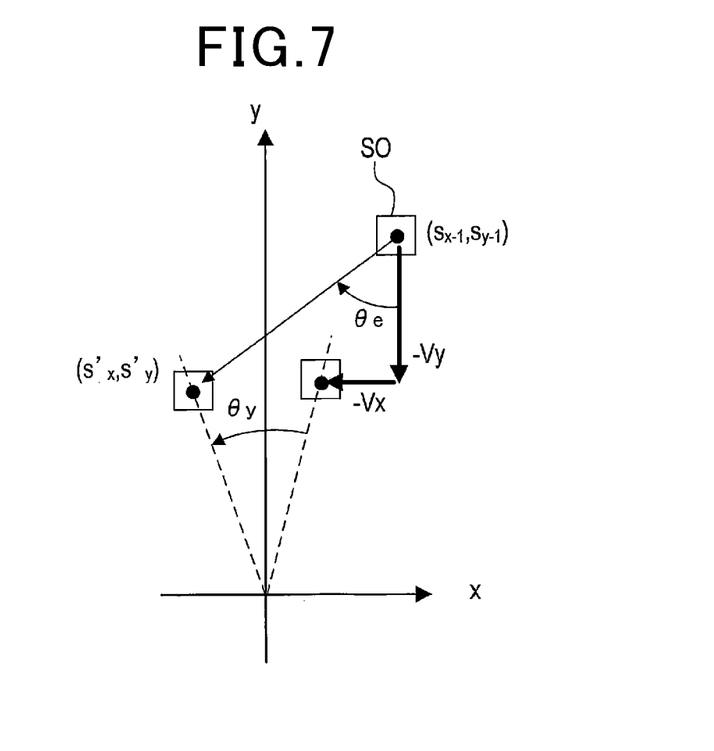
FIG. 7 is a diagram showing a second vector angle.

As shown in FIG. 7, the second vector θe refers to an angle of a vector in which the start point is the position (Sx-1, Sy-1) of the stationary object detected at a time a measurement period Tm prior to the current period and the end point of the estimation position (S'x, S'y) of the vehicle. Hence, the processing unit 60 calculates the second vector angle θe in accordance with the equation (3) below.

[Math 2]

$$\begin{bmatrix} S'_x \\ S'_y \end{bmatrix} = \begin{bmatrix} \cos\theta_y & -\sin\theta_y \\ \sin\theta_y & \cos\theta_y \end{bmatrix} \begin{bmatrix} S_{x-1} + (-v_x) \\ S_{y-1} + (-v_y) \end{bmatrix} \quad (2)$$

$$\theta e = \tan^{-1}\left(\frac{S'_x - S_{x-1}}{S'_y - S_{y-1}}\right) \quad (3)$$

Then, as shown in FIG. 4, the processing unit 60 calculates, at S460, the axial displacement angle θgap in accordance with the equation (4) and proceeds to S470. Note that, the axial displacement angle θgap is calculated based on the measurement result of all of the stationary objects detected at S410. Specifically, in the case where the measurement result of m stationary objects at S410 is acquired, m axial displacement angles θgap are calculated by the processes of S440 to S460.

[Math 3]

$$\theta_{gap} = \theta b - \theta e \quad (4)$$

When the process proceeds to S470, the processing unit 60 executes an extraction process of the axial displacement angle. Specifically, the processing unit 60 extracts only the axial displacement angles θgap within a predetermined angle range. The M pieces of angle θ1gap thus extracted are stored into the RAM of the processing unit 60.

Further, the processing unit 60 stores a value, where M which is the number of extracted axial displacement angles is added to a value stored in the number of detection of axial displacement angle C provided in the RAM of the processing unit 60, into the number of detection of axial displacement angle C.

[Math 4]

$$C = C + M \quad (5)$$

When the axial displacement estimation process is terminated, as shown in FIG. 3, the processing unit 60 determines whether the value stored in the number of detected axial displacement C is larger than or equal to a predetermined correction determination count J. Here, when the value stored in the number of detected axial displacement C is less than the correction determination count J, the processing unit 60 terminates the axial displacement correction process in the current cycle.

On the other hand, when the value stored in the number of detected axial displacement C is larger than or equal to the correction determination count J, the processing unit 60 calculates an average value of the axial displacement angle θgap at S240. The average value of C axial displacement angle θgap in the latest calculation is referred to as an axial displacement angle average value θ_ave.

Next, the processing unit 60 calculates, at step S250, a median value of the axial displacement angle θgap. The median value is a value positioned at the center in plurality of data arranged from lowest to highest. The median value of C axial displacement angle θgap in the latest calculation is referred to as an axial displacement angle median value θ_med.

Further, at S260, the processing unit 60 initializes the RAM region of the processing unit 60, where the calculation count C pieces of axial displacement angle $\theta_{gap}$ are stored, to initialize the values stored in the calculation count C to be 0.

Then, the processing unit 60 determines whether a predetermined error condition is satisfied at S270. The predetermined error condition according to the present embodiment is to determine whether the axial displacement is excessively large, or whether the axial estimation result is apparently abnormal. Specifically, it is determined whether the absolute value of the axial displacement angle average value θ_ave is larger than or equal to a predetermined error determination angle.

In the case where the error condition is satisfied, the processing unit 60 proceeds to S300, initializes the average value calculated at S240, the median value calculated at S250 and a provisional axial displacement estimation angle θ'_est (described later) and terminates the axial displacement correction process in the current period. On the other hand, when the error condition is not satisfied, the processing unit 60 determines whether a predetermined retry condition is satisfied at S280. The retry condition according to the present embodiment is to determine whether errors of the axial displacement angle average value θ1_ave with respect to an axial displacement true value are within an allowable range. The retry condition according to the present embodiment is satisfied when at least one of the following first retry determination condition and a second retry determination condition is satisfied.

The first retry determination condition is satisfied when the absolute value of the axial displacement angle average value θ_ave is larger than or equal to the predetermined first retry determination angle. According to the present embodiment, the first retry determination angle is set to be smaller than the first error determination angle.

The second retry determination condition is satisfied when the absolute value of a difference between the axial displacement angle average value θ_ave and the axial displacement median value θ_med is larger than or equal to the predetermined second retry determination angle.

Figure 8:
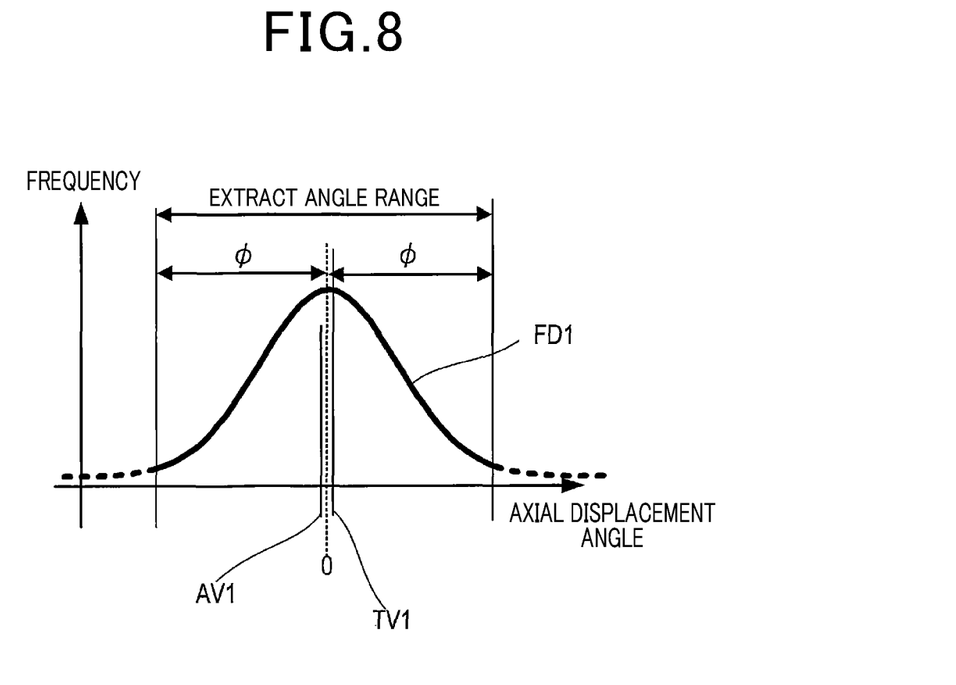
FIG. 8 is a graph showing a frequency distribution of the axial displacement angle in the case where the average value and the true value are substantially the same.

As shown in FIG. 8, when the true value TV1 of the axial displacement angle is small (i.e. axial displacement amount is small), a frequency distribution FD1 of the axial displacement angle extracted within an extraction angle range which is set from −φ[°] to +φ[°] is symmetrical, and the average value AV1 of the axial displacement angles is substantially the same as the true value TV1 of the axial displacement angle.

Figure 9:
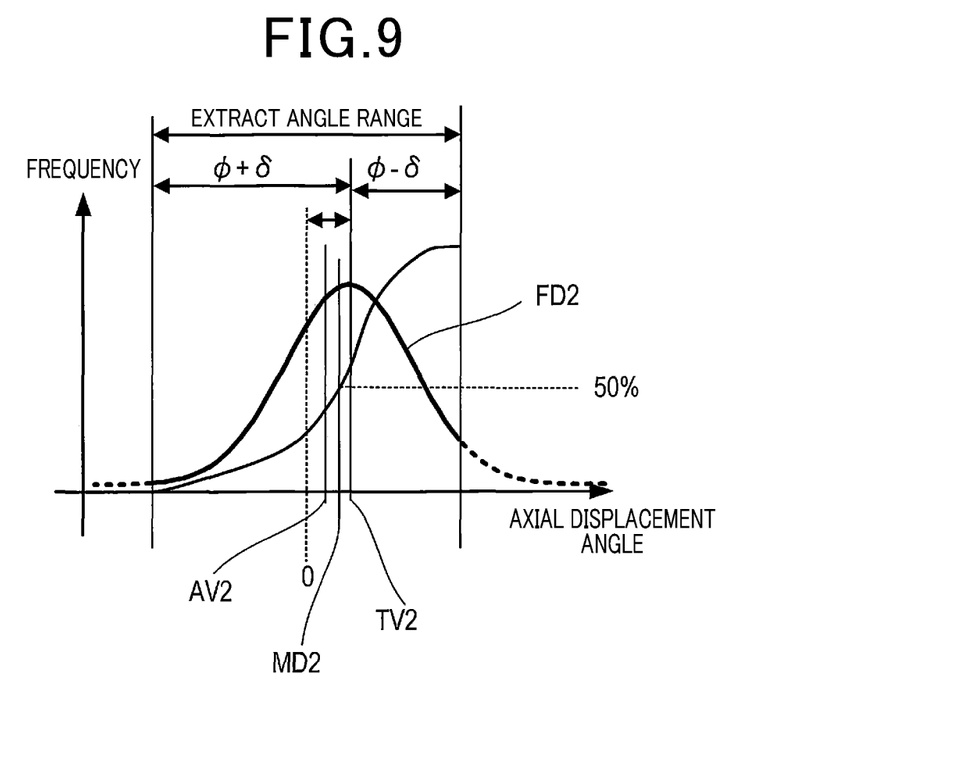
FIG. 9 is a graph showing a frequency distribution of the axial displacement angle in the case where a large difference is present between the average value and the true value.

As shown in FIG. 9, when the true value TV2 of the axial displacement angle is large (i.e. axial displacement amount is large), a frequency distribution FD2 of the axial displacement angle extracted within the extraction angle range which is set from −φ[®] to +φ[°] is asymmetrical, and the difference between the average value AV2 of the axial displacement angles and the median value MD2 of a plurality of axial displacement angles becomes large.

Figure 10:
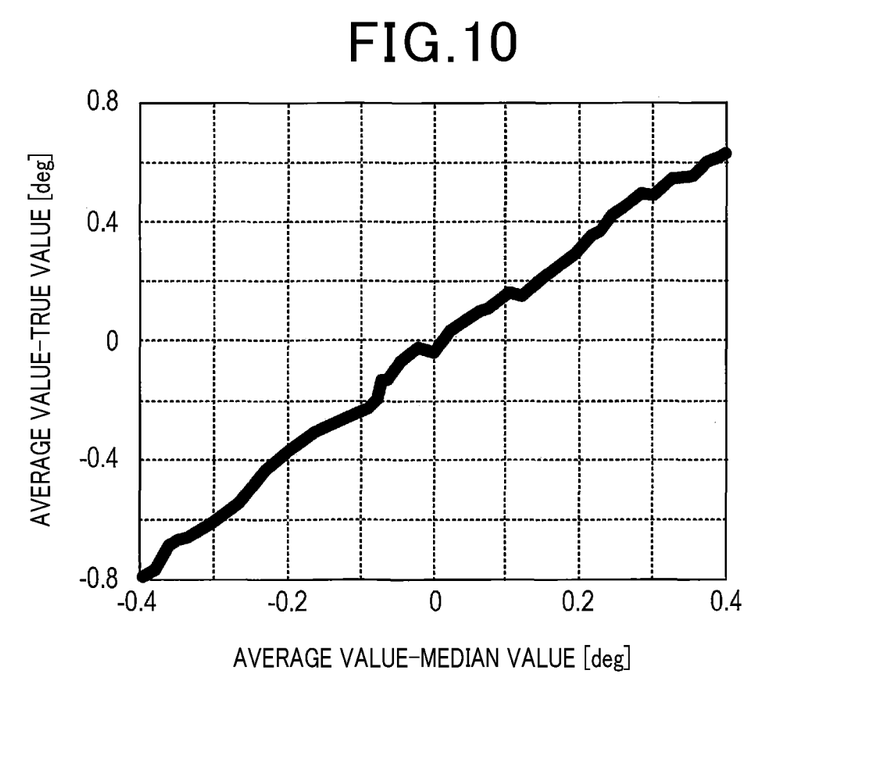
FIG. 10 is graph showing a relationship between a difference value where a median value is subtracted from the average value and a difference value where a true value is subtracted from the average value.

As shown in FIG. 10, a difference value where the median value of the axial displacement angle is subtracted from the average value of the axial displacement angles has a positive correlation with a subtract value where the true value of the axial displacement angle is difference from the average value of the axial displacement angles.

As shown in FIG. 10, the second retry determination condition is set based on a fact that the larger the difference between the average value of the axial displacement angle and the median value of the axial displacement angle, the larger the difference between the true value of the axial displacement angle and the average value of the axial displacement angles is.

Figure 11:
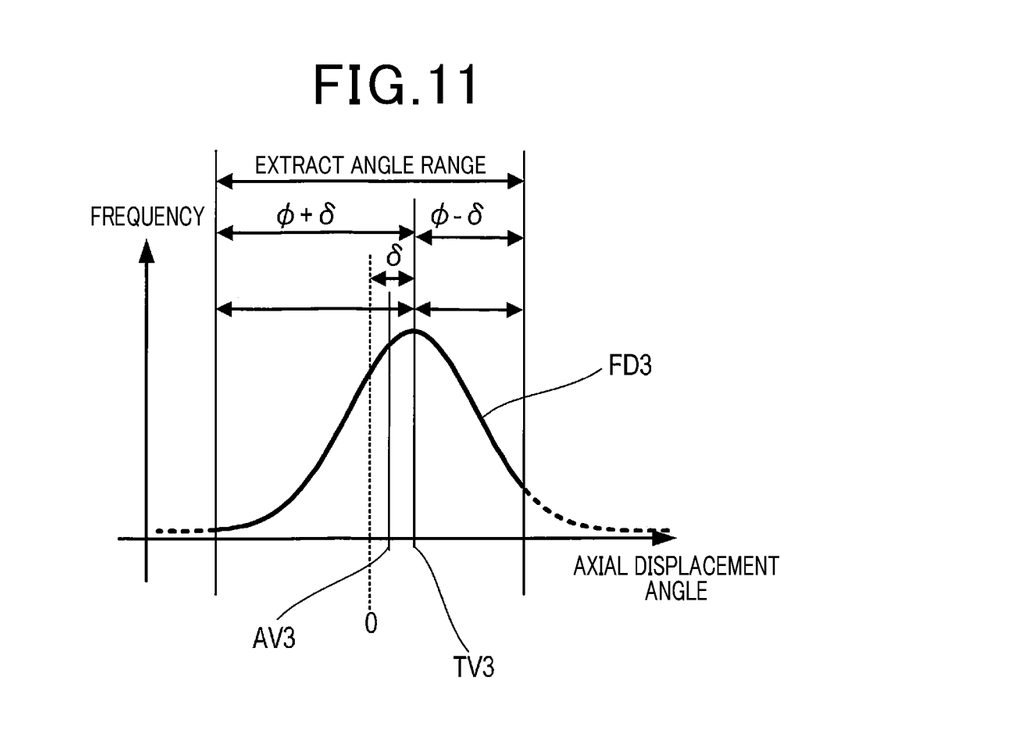
FIG. 11 is a diagram showing a frequency distribution of the axial displacement angle in the case where the axial displacement is large.

As shown in FIG. 11, when the true value TV3 of the axial displacement angle is 6 (i.e. axial displacement amount is large), a frequency distribution FD3 of the axial displacement angle extracted within the extraction angle range which is set from −φ[°] to +φ[°] is asymmetrical, and the difference between the average value AV3 of a plurality of the axial displacement angles and the true value TV3 of the axial displacement angle becomes large.

Figure 12:
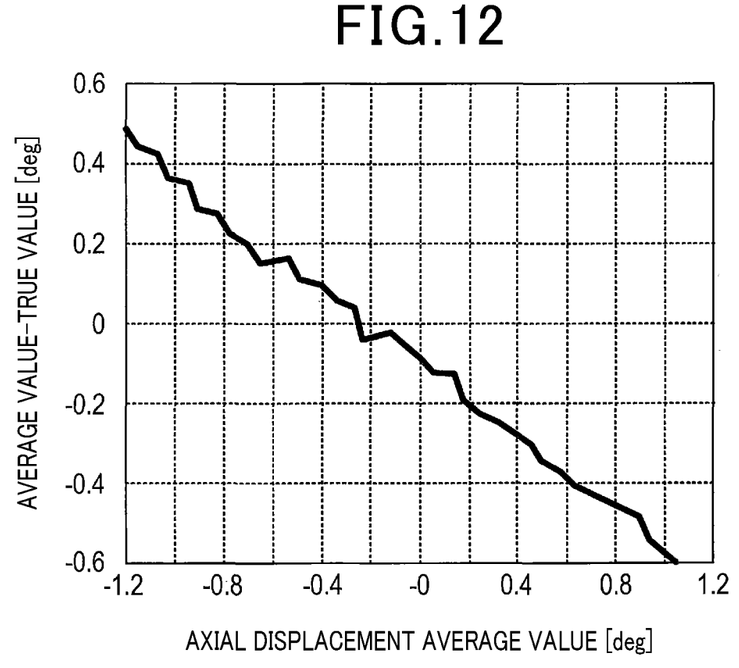
FIG. 12 is a graph showing a relationship between the average value and a difference value where the true value is subtracted from the average value.

As shown in FIG. 12, the average value of the axial displacement angle has a negative correlation with a difference value where the true value of the axial displacement angle is subtracted from the average value of the axial displacement angles.

As shown in FIG. 12, the first retry determination condition is set based on a fact that the larger the average value of the axial displacement angle, the larger the difference between the average value of the axial displacement angles and the true value of the axial displacement angle.

Here, when the retry condition is satisfied, the processing unit 60 proceeds to S310, stores the axial displacement angle average θ_ave into the RAM as a provisional axial displacement estimation angle θ'_est, and sets the processes of S50 such that the center axis of the reception antenna 40 is assumed to be shifted by the axial displacement estimation angle θ_est in a generation process of the detection value at S50, thereby performing the calculation. Hereinafter, when the retry condition is satisfied again, the process adds the axial displacement angle average value θ_ave to the provisional axial displacement estimation angle θ'_est, thereby calculating the provisional axial displacement estimation angle θ'_est. On the other hand, when the retry condition is not satisfied, the processing unit 60 performs an axial correction at S290. Specifically, the processing unit 60 stores the axial displacement angle average value θ_ave into the RAM as an axial displacement estimation angle θ_est, and sets the process of S50 such that the center axis of the reception antenna 40 is assumed to be shifted by the axial displacement estimation angle θ_est in a generation process of the detection value at S50, thereby performing the calculation. In the case where the provisional axial displacement estimation angle θ'_est is set at S310, the process stores a value in which the provisional axial displacement estimation angle θ'_est is added to the axial displacement angle average value θ_ave into the RAM as an axial displacement estimation angle θ_est.

When the process of axial correction at S290 is completed, the processing unit 60 initializes, at S300, the average value calculated at S240 and the median value calculated at S250 and θ'_est calculated at S310, and terminates the axial displacement correction process.

The processing unit 60 thus configured repeatedly calculates the axial displacement angle based on the detection result of the radar apparatus 1.

The processing unit 60 determines, based on the calculated axial displacement angle average value θ_ave and the axial displacement angle median value θ_med, whether a predetermined allowable condition is met. The allowable condition is a condition where the above-described error condition and the retry condition are not satisfied.

The processing unit 60 utilizes, when the allowable condition is met, the calculated axial displacement angle average value θ_ave as an estimation result of the axial displacement angle.

Thus, when the allowable condition, which is set in advance based on the axial displacement angle average value θ_ave and the axial displacement angle median value θ_med, is not met, the processing unit 60 determines that the estimation accuracy of the axial displacement angle is deteriorated, and does not utilize the axial displacement angle average value θ_ave as an estimation result of the axial displacement angle. As a result, the estimation result of the axial displacement angle can be improved.

When the allowable condition is not met because the retry condition is satisfied, the processing unit 60 stores the axial displacement angle estimation result into the RAM as the provisional axial displacement estimation angle, assumes that the axis is displaced by the calculated axial estimation angle and again executes the estimation of the axial displacement angle.

Thus, the processing unit 60 suppresses an unfavorable event where the axial displacement angle estimation result having low estimation accuracy is utilized, thereby improving the estimation accuracy.

Further, the allowable condition is defined such that a difference between the axial displacement angle average value θ_ave and the axial displacement angle median value θ_med is less than a predetermined second retry determination angle. With this, the processing unit 60 is able to simply determine whether the allowable condition is met, whereby the processing load can be reduced.

According to the above-described embodiments, the processing unit 60 corresponds to an axial displacement estimation device, step S220 corresponds to a process of an angle calculation unit, step S240 corresponds to a process of an average value calculation unit, and step S250 corresponds to a process of a median value calculation unit.

Also, steps S270 and S280 correspond to processes of utilization determination unit and non-utilization unit, step S290 correspond to a process of utilization unit, and the second retry determination angle corresponds to utilization determination value.

In the foregoing description, one embodiment of the present disclosure is described. However, the present disclosure is not limited to the above-described embodiment and may be modified in various manners.

(First Modification)

According to the above-described embodiments, an embodiment is exemplified in which the estimation of the axial displacement angle is executed again when determined that no allowable condition is met because the retry condition is satisfied. However, the calculation of the axial displacement angle average value ave may be terminated, when determined that no allowable condition is met because the retry condition is satisfied.

The processing unit 60 and method thereof disclosed in the present disclosure may be accomplished by a dedicated computer constituted of a processor and a memory programmed to execute one or more functions embodied by computer programs. Alternatively, the processing unit 60 and method thereof disclosed in the present disclosure may be accomplished by a dedicated computer provided by a processor configured of one or more dedicated hardware logic circuits. Further, the processing unit 60 and method thereof disclosed in the present disclosure may be accomplished by one or more dedicated computers where a processor and a memory programmed to execute one or more functions, and a processor configured of one or more hardware logic circuits are combined. Furthermore, the computer programs may be stored, as instruction codes to be executed by the computer, into a computer readable non-transitory tangible recording media. A method for achieving respective functions included in the processing unit 60 does not necessarily include software, and all of functions may be accomplished by one or more hardware units.

Multiple functions of a single component in the above-described embodiment may be implemented by multiple components, and a single function of a single component may be implemented by multiple components. Moreover, multiple functions of multiple components may be implemented by a single component, and a single function implemented by multiple components may be implemented by a single component. Further, some of the configurations of the above-described embodiments may be omitted. In addition, at least some of the configurations of the above-described embodiments may be added to or replaced with the configurations of the other embodiments described above.

The present disclosure can be achieved by various modes such as a system having the radar apparatus 1 as a constituent other than the above-described radar apparatus 1, a program causing the radar apparatus 1 to function as a computer, a non-transitory substantial recording media such as semiconductor memory, an axial displacement estimation method and the like.

CONCLUSION

The present disclosure improves an estimation accuracy of the axial displacement angle. One aspect of the present disclosure provides an axial displacement estimation device that estimates an axial displacement angle of a radar apparatus mounted on a mobile body. The axial displacement estimation device includes an angle calculation unit, an average value calculation unit, a median value calculation unit, a utilization determination unit and a utilization unit.

The angle calculation unit is configured to repeatedly calculate the axial displacement angle based on a detection result of the radar apparatus.

The average value calculation unit is configured to extract the axial displacement angle included in a predetermined extraction angle range among a plurality of axial displacement angles calculated by the angle calculation unit, and calculate an average value of the extracted plurality of axial displacement angles to be an axial displacement angle average value.

The median value calculation unit is configured to extract the axial displacement angle included in the predetermined extraction angle range among the plurality of axial displacement angles calculated by the angle calculation unit, and calculate a median value of the extracted plurality of axial displacement angles to be an axial displacement angle median value.

The utilization determination unit configured to determine, based on the axial displacement angle average value calculated by the average value calculation unit and the axial displacement angle median value calculated by the median value calculation unit, whether a predetermined allowable condition is met.

The utilization unit is configured to utilize, when the utilization determination unit determines that the predetermined allowable condition is met, the axial displacement angle average value calculated by the average value calculation unit as an estimation result of the axial displacement angle.

The angle displacement estimation device according to the present disclosure thus configured determines that the estimation accuracy of the axial displacement angle is deteriorated, when the allowable condition, which is set in advance based on the axial displacement angle average value and the axial displacement angle median value, is not met, and does not utilize the axial displacement angle average value as an estimation result of the axial displacement angle. As a result, the estimation result of the axial displacement angle can be improved.

What is claimed is:

1. An axial displacement estimation device that estimates an axial displacement angle of a radar apparatus mounted on a mobile body, comprising:
    an angle calculation unit configured to repeatedly calculate the axial displacement angle based on a detection result of the radar apparatus;
    an average value calculation unit configured to extract the axial displacement angle included in a predetermined extraction angle range among a plurality of axial displacement angles calculated by the angle calculation unit, and calculate an average value of the extracted plurality of axial displacement angles to be an axial displacement angle average value;
    a median value calculation unit configured to extract the axial displacement angle included in the predetermined extraction angle range among the plurality of axial displacement angles calculated by the angle calculation unit, and calculate a median value of the extracted plurality of axial displacement angles to be an axial displacement angle median value;

a utilization determination unit configured to determine, based on the axial displacement angle average value calculated by the average value calculation unit and the axial displacement angle median value calculated by the median value calculation unit, whether a predetermined allowable condition is met; and a utilization unit configured to utilize, when the utilization determination unit determines that the predetermined allowable condition is met, the axial displacement angle average value calculated by the average value calculation unit as an estimation result of the axial displacement angle.

2. The axial displacement estimation device according to claim 1, wherein the axial displacement estimation device is provided with a non-utilization unit; and the non-utilization unit is configured not to utilize, when the utilization determination unit determines that the predetermined allowable condition is not met, a calculation result of the average value calculation unit, and to again execute or complete a calculation of the axial displacement angle average value by the average value calculation unit.

3. The axial displacement estimation device according to claim 1, wherein the allowable condition is set to satisfy a condition in which an absolute value of a difference between the axial displacement angle average value calculated by the average value calculation unit and the axial displacement angle median value calculated by the median value calculation unit is less than or equal to a predetermined utilization determination value.

* * * * *